US011542876B2

United States Patent
McCarthy, Jr. et al.

(10) Patent No.: US 11,542,876 B2
(45) Date of Patent: Jan. 3, 2023

(54) AFTERTREATMENT TEMPERATURE MANAGEMENT VIA BOOT-SHAPED VALVE LIFT PROFILES

(71) Applicant: Eaton Intelligent Power Limited, Dublin (IE)

(72) Inventors: James E. McCarthy, Jr., Kalamazoo, MI (US); Matthew A. Vance, Kalamazoo, MI (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 16/609,196

(22) PCT Filed: Apr. 30, 2018

(86) PCT No.: PCT/IB2018/000606
§ 371 (c)(1),
(2) Date: Oct. 28, 2019

(87) PCT Pub. No.: WO2018/197954
PCT Pub. Date: Nov. 1, 2018

(65) Prior Publication Data
US 2020/0088116 A1 Mar. 19, 2020

Related U.S. Application Data

(60) Provisional application No. 62/492,093, filed on Apr. 28, 2017.

(51) Int. Cl.
*F01L 13/00* (2006.01)
*F02D 13/02* (2006.01)
(Continued)

(52) U.S. Cl.
CPC ...... *F02D 13/0261* (2013.01); *F01L 13/0036* (2013.01); *F02D 41/024* (2013.01);
(Continued)

(58) Field of Classification Search
CPC ............ F02D 13/0261; F02D 13/0207; F02D 13/0219; F02D 13/0246; F02D 13/0257;
(Continued)

(56) References Cited

U.S. PATENT DOCUMENTS 6,932,062 B2  8/2005  Kuzuyama et al.
8,113,157 B2  2/2012  Nakamura
(Continued)

FOREIGN PATENT DOCUMENTS

CN    1614207 A    5/2005
CN    101749062 A  6/2010
(Continued)

OTHER PUBLICATIONS

International Search Report and Written Opinion for PCT/IB2018/000606, dated Oct. 24, 2018; pp. 1-17.
(Continued)

*Primary Examiner* — Zelalem Eshete
(74) *Attorney, Agent, or Firm* — Pearne & Gordon LLP

(57) ABSTRACT

A method for advancing valve actuation during low load or idle diesel engine conditions to promote aftertreatment heat up comprises switching a cam phaser from a nominal lift position to an advance lift position to open an affiliated valve before nominal. Valve lift is actuated via the cam phaser. The valve is lowered towards nominal closure, and valve closure is interrupted by actuating a latch phaser. Valve closure is extended beyond nominal valve closure.

18 Claims, 5 Drawing Sheets

(51) Int. Cl.
*F02D 41/02* (2006.01)
*F02M 26/01* (2016.01)
*F02D 41/00* (2006.01)

(52) U.S. Cl.
CPC ....... *F01L 2305/00* (2020.05); *F01L 2800/00* (2013.01); *F02D 13/0207* (2013.01); *F02D 13/0219* (2013.01); *F02D 41/006* (2013.01); *F02D 2041/001* (2013.01); *F02D 2200/0802* (2013.01); *F02M 26/01* (2016.02)

(58) Field of Classification Search
CPC ............. F02D 2041/001; F02D 41/024; F02D 41/006; F02D 2200/0802; F01L 13/0036; F01L 2305/00; F01L 2800/00; F01L 2800/10; F01L 2013/103; F01L 1/185; F01L 2001/186; F02M 26/01
See application file for complete search history.

(56) References Cited

U.S. PATENT DOCUMENTS

| | | |
|---|---|---|
| 8,312,849 B2 | 11/2012 | Roe et al. |
| 2005/0098148 A1 | 5/2005 | Kuzuyama et al. |
| 2006/0144356 A1 | 7/2006 | Sellnau et al. |
| 2008/0047509 A1 | 2/2008 | Sellnau et al. |
| 2008/0215228 A1 | 9/2008 | Krebber-Hortmann |
| 2010/0050965 A1 | 3/2010 | Nakamura |
| 2011/0139099 A1 | 6/2011 | Roe et al. |
| 2013/0340728 A1 | 12/2013 | Keating |
| 2015/0361916 A1* | 12/2015 | Kang .................. F02D 41/0002 123/90.17 |

FOREIGN PATENT DOCUMENTS

| | | |
|---|---|---|
| CN | 106414918 A | 2/2017 |
| DE | 102005031241 A1 | 1/2007 |
| DE | 102008051496 A1 | 5/2009 |
| EP | 2048331 A2 | 4/2009 |
| GB | 1466589 A | 3/1977 |
| JP | 2006329022 A | 12/2006 |
| JP | 2012057491 A | 3/2012 |
| JP | 2013053609 A | 3/2013 |
| JP | 2015-209798 A | 11/2015 |
| JP | 2017061939 A | 3/2017 |
| WO | 2017060492 A1 | 4/2017 |
| WO | 2017060496 A1 | 4/2017 |
| WO | 2017116917 A1 | 7/2017 |

OTHER PUBLICATIONS

Roberts, L. et al., "Modeling the Impact of Early Exhaust Valve Opening on Exhaust Aftertreatment Thermal Management and Efficiency for Compression Ignition Engines", International Journal of Engine Research, (Oct. 6, 2014).

Roberts, Leighton et al., "Impact of Early Exhaust Valve Opening On Exhaust Aftertreatment Thermal Management and Efficiency for Compression Ignition Engines," SAE Coommercial Vehicle Conference, Oct. 7-9, 2014 in Chicago, SAE International 14CV-0335, pp. 1-19.

\* cited by examiner

AFTERTREATMENT TEMPERATURE MANAGEMENT VIA BOOT-SHAPED VALVE LIFT PROFILES

This is a § 371 National Stage Entry of Patent Cooperation Treaty Application No. PCT/IB2018/000606, filed Apr. 30, 2018 which claims the benefit of U.S. provisional application No. 62/492,093, filed Apr. 28, 2017, all of which are incorporated herein by reference.

FIELD

This application provides a system and actuation methods for managing aftertreatment temperatures in diesel engine systems via boot-shaped valve lift profiles.

BACKGROUND

A cold aftertreatment cannot filter pollution effectively, leading to high tailpipe emissions. Typical diesel engine systems can take 600 or more seconds to heat up enough for effective pollution management via the catalyst. So, it is desired to heat the aftertreatment quickly.

EEVO (early exhaust valve opening) can be used to increase exhaust temperatures on the order of 30 to 80 degrees, but doing so imposes a fuel penalty of 12 to 22% increase in fuel use. Techniques for EEVO are discussed in Roberts, L. et al. "Modeling the Impact of Early Exhaust Valve Opening on Exhaust Aftertreatment Thermal Management and Efficiency for Compression Ignition Engines," International Journal of engine Research, 10.1177/1468087414551616, Oct. 6, 2014 and Roberts, L. et al. "Impact of Early Exhaust Valve Opening on Exhaust Aftertreatment Thermal Management and Efficiency for Compression Ignition Engines," SAE CV-0335, SAE Commercial Vehicle Congress 2014, October 2014, Rosemount, Ill., USA.

SUMMARY

The methods and devices disclosed herein overcome the above disadvantages and improves the art by way of a method for exhaust thermal management in a diesel combustion engine, comprising implementing late exhaust valve closing on one exhaust valve of a pair of exhaust valves. Opening an intake valve can provide negative valve overlap, where both the intake valve and the one exhaust valve are open at the same time. Internal exhaust valve recirculation can be implemented via the negative valve overlap. The exhaust temperature of an affiliated exhaust stream can be increased via the internal exhaust valve recirculation.

The late exhaust valve closing can be implemented via cam phasing. The late exhaust valve closing can be done at a lower lift of the one exhaust valve than the second exhaust valve of the pair of exhaust valves. The late exhaust valve closing can be done at a lower lift of the one exhaust valve than a normal lift profile of the pair of exhaust valves. The lift profile of the late exhaust valve closing is selected to prevent complete release of the exhaust gas. Early exhaust valve opening can be implemented on the one exhaust valve. Or, early exhaust valve opening can be implemented on the pair of exhaust valves. The late exhaust valve closing can be timed to be implemented when a piston of the one exhaust valve is at top dead center of an affiliated cylinder. The late exhaust valve closing can be timed to be completed when an immediately subsequent intake valve lift is at or near its midpoint.

An apparatus for electronic exhaust valve cam phasing can comprise an engine camshaft comprising eccentric lobed cams, an actuatable set of exhaust valves coupled to follow the rotation of the eccentric lobed cams, and a latch phaser coupled via a linkage to the engine camshaft. Also, at least one switching roller finger follower can comprise an actuatable latch and mechanisms for imparting two different lift profiles to an affiliated one of the exhaust valves of the set of exhaust valves, the at least one switching roller finger follower coupled between one of the eccentric lobed cams and the affiliated one of the exhaust valves, the at least one switching roller finger follower further coupled between the latch phaser and the actuatable latch.

The latch phaser can be controllable to actuate the actuatable latch. The latch phaser can comprise at least a second eccentric cam lobe on a second cam rail, and the second eccentric cam lobe can actuates the actuatable latch when the linkage transfers motion from the engine camshaft to the latch phaser.

The apparatus can comprise a gear on the second cam rail. An exhaust cam phaser can be coupled to the engine camshaft, wherein the latch phaser comprises a gear on a second cam rail, and wherein the linkage is between the exhaust cam phaser and the gear on the second cam rail. The second cam rail can be controllable to actuate the actuatable latch, and wherein, with no rotation on the second cam rail, the actuatable latch is in an unlatched position, and a normal exhaust profile results on the affiliated one of the exhaust valves. The second cam rail can be controllable to actuate the actuatable latch, and wherein, with rotation of the second cam rail, the actuatable latch is in a latched position, and a late exhaust valve closing profile results on the affiliated one of the exhaust valves.

The linkage can comprise a step-up mechanism arranged so that the engine camshaft can be rotated between a nominal position and an early exhaust valve opening position and so that the latch phaser can be moved between a latch engaged position and a latch disengaged position. The step-up mechanism can transfer a ratio of relative motion other than 1:1 through the linkage from the engine camshaft to the latch phaser.

The exhaust cam phaser can electronically controlled and is configured to couple to a vehicle on-board diagnostics module.

The late exhaust valve closing profile results in a smaller amount of lift on the affiliated one of the exhaust valves than a normal exhaust valve profile.

With rotation of the second cam rail, the actuatable latch is in a latched position, and an early exhaust valve opening is combined with the late exhaust valve closing profile on the affiliated one of the exhaust valves.

The early exhaust valve opening has a higher lift profile than the late exhaust valve closing profile.

A second exhaust valve of the set of exhaust valves can be configured to follow an early exhaust valve opening profile. The second exhaust valve of the set of exhaust valves can be further configured to transition from the early exhaust valve opening profile to a late exhaust valve closing profile.

At least one intake valve can be configured to implement a late intake valve closing profile. The at least one intake valve is further configured to transition from a late intake valve opening profile to the late intake valve closing profile.

A method for advancing valve actuation during low load or idle diesel engine conditions to promote aftertreatment heat up comprises switching a cam phaser from a nominal lift position to an advance lift position to open an affiliated valve before nominal. Valve lift is actuated via the cam phaser. The valve is lowered towards nominal closure, and valve closure is interrupted by actuating a latch phaser. Valve closure is extended beyond nominal valve closure.

Additional objects and advantages will be set forth in part in the description which follows, and in part will be obvious from the description, or may be learned by practice of the disclosure. The objects and advantages will also be realized and attained by means of the elements and combinations particularly pointed out in the appended claims.

It is to be understood that both the foregoing general description and the following detailed description are exemplary and explanatory only and are not restrictive of the claimed invention.

DETAILED DESCRIPTION

Reference will now be made in detail to the examples which are illustrated in the accompanying drawings. Wherever possible, the same reference numbers will be used throughout the drawings to refer to the same or like parts. Directional references such as "left" and "right" are for ease of reference to the figures.

The systems and methods disclosed herein overcome the above disadvantages and improves the art by way of increasing exhaust temperature on the order of 100 degrees. An apparatus that includes an electro-mechanical latch linked by a linkage to a cam phaser can be used to implement the heating technique.

Additionally, applying IEGR (internal exhaust gas recirculation) techniques can permit an approximately 30 degree change in exhaust temperature.

The proposal increases exhaust temperature for diesel engine systems on the order of 100 Degrees Centigrade and implements electro-mechanical latch without adding an extra motor to the engine. The solution enables OBD (on-board diagnostics) sensing through technology on the cam phaser.

Figure 1:
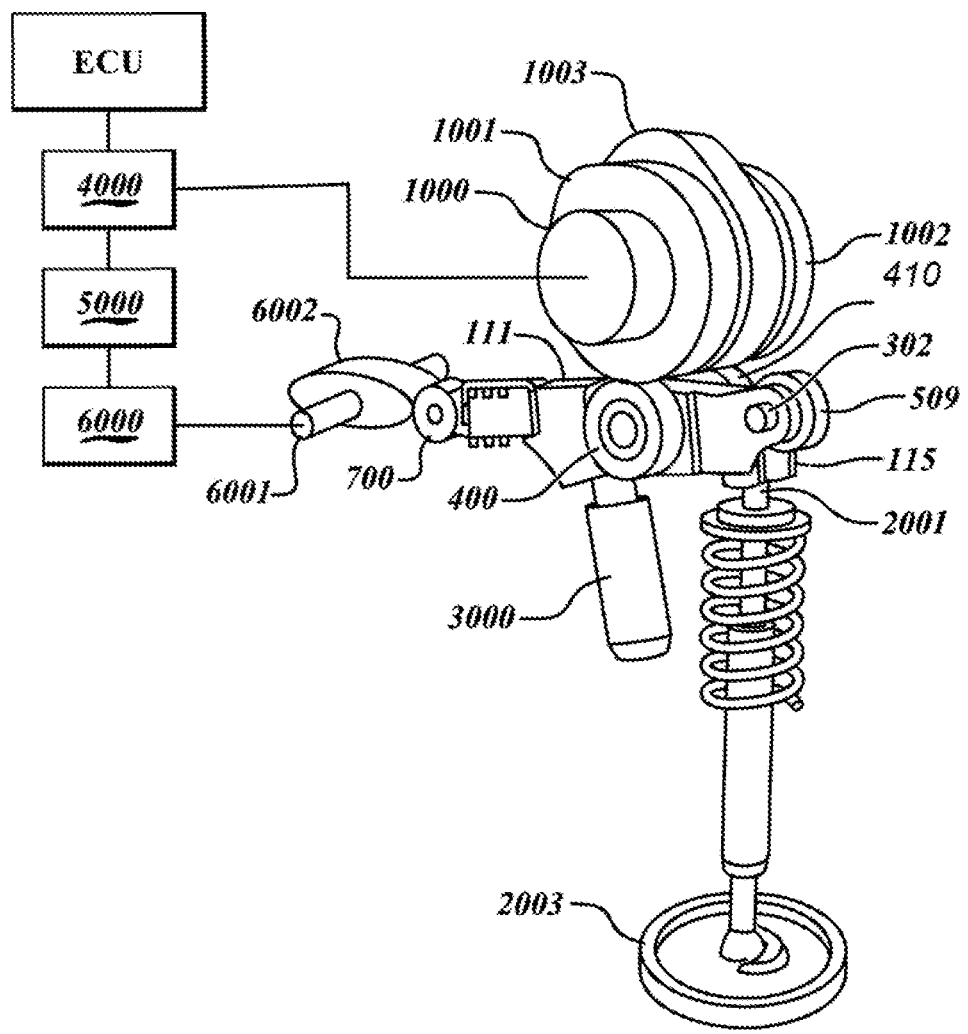
FIG. 1 shows a portion of a valve actuation system.

FIG. 1 schematically shows a portion of a valve actuation system that can implement the valve lift profiles disclosed herein. An electronic control unit ("ECU") can be a computing device comprising at least a processor, memory and stored algorithms for execution by the processor. The algorithms can comprise the methods disclosed herein. The ECU can additionally comprise inputs for collecting data and commands and outputs for issuing commands. As drawn, commands can be issued from the ECU to a cam phaser 4000 of an engine camshaft 1000. The cam phaser 4000 can be controlled to shift the cam shaft 1000 between a nominal lift position and an early exhaust valve opening ("EEVO") position. The cam phaser 4000 can be integrated with the engine camshaft 1000 according to known techniques.

A linkage 5000 is included between the cam phaser 4000 and a latch phaser 6000. The linkage 5000 can be any one of a variety of mechanisms, such as a gear drive, a chain drive, a lever, among others. Linkage 5000 can comprise a step-up mechanism such as a step up gear or other device that changes the ratio of motion transferred from the cam phaser 4000 to the latch phaser 6000. For example, the cam phaser can be rotated 5 degrees or 45 degrees, or some other number or degrees depending upon the extent of early exhaust valve opening selected. The step-up mechanism would mechanically transfer a ratio of that motion to the latch phaser 6000.

As drawn, the latch phaser 6000 comprises a latch phasing cam lobe 6002 on a second cam rail 6001. A gear or other coupler can be affixed to the second cam rail 6001 to rotate the cam lobe 6002. As drawn, rotating the second cam rail by 90 degrees can switch between the latched ends 6010 or 6020 pressing on the actuatable latch 900 and the unlatched sides 6011 or 6021 pressing on the roller 700 of the actuatable latch 900.

Figure 2A:
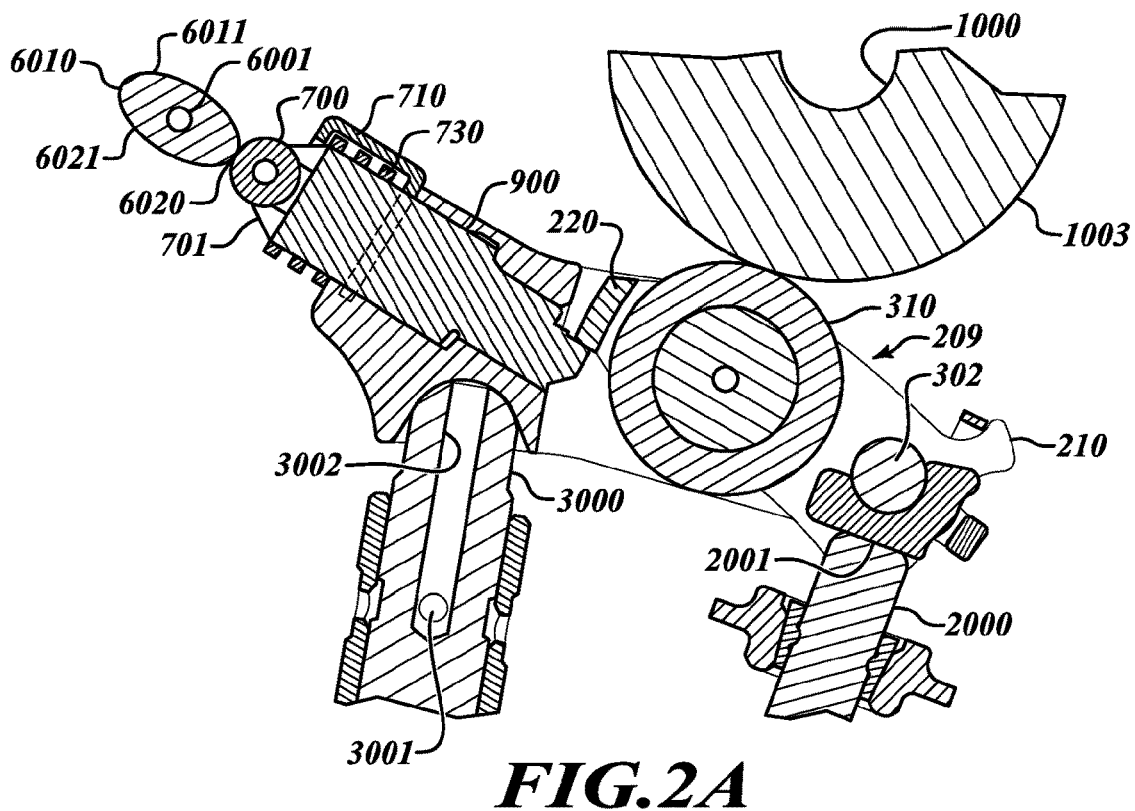
FIGS. 2A & 2B contrast a rocker arm in a valvetrain at base circle and at full actuation of the inner arm assembly.
Figure 2B:
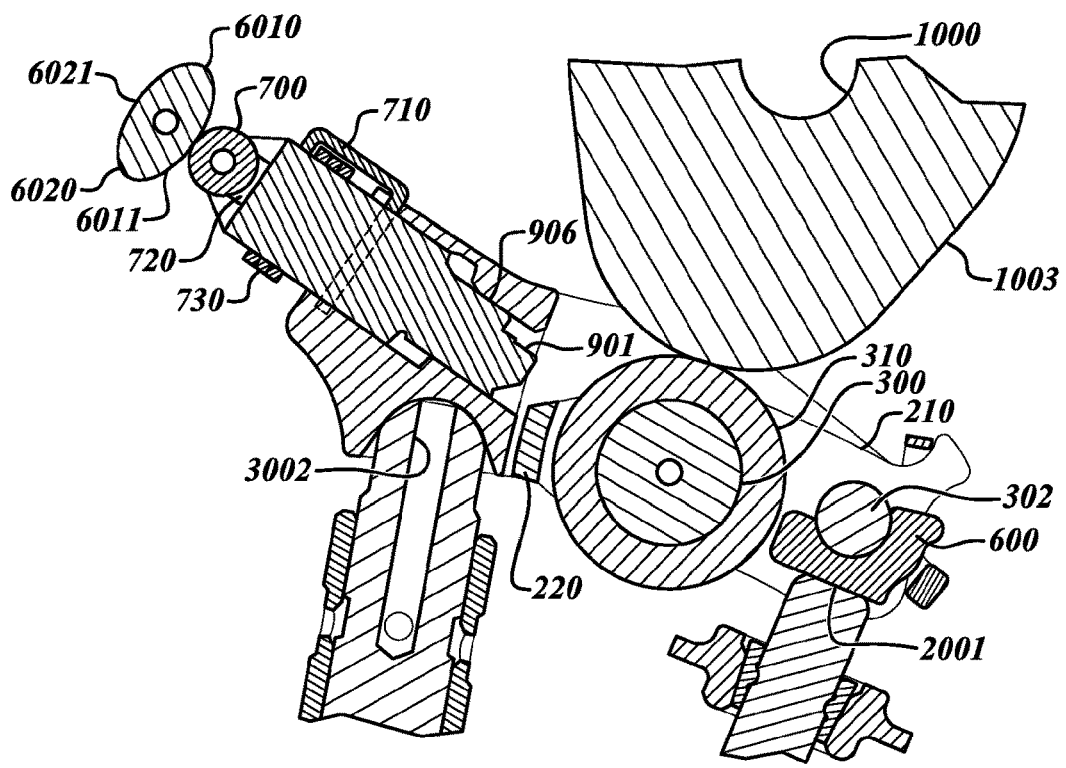

The latch 900 can comprise a mounting arm 701 for mounting a roller 700 that can follow the latch phasing cam 6002. A spring 730 is mounted to the latch 900 and in a cage 710 so that the spring can expand when the latch phasing cam lobe is in the latched position (FIG. 2A). The spring 730 can tug on the latch 900 and coil when the latch phasing cam lobe 6002 is in the unlatched position (FIG. 2B). The cage 710 can straddle the latch 900 and can be fitted in a seat 720 on the latch and fitted in a slot in the body 111 of the switching roller finger follower.

Other latch mechanisms and latch phasers can be used with the teachings of this disclosure. For example, an actuator and latching mechanism such as disclosed in WO 2017/060496.

The switching roller finger follower (SRFF) or "rocker arm" can constitute a variety of configurations, including an actuated latch and single roller with corresponding single lobe. Or, a configuration such as disclosed in WO 2017/060496 can be used, among others. Or latched slider pad configurations can be substituted complementary to the methods disclosed herein.

As shown in FIGS. 1, 2A & 2B, three eccentric cam lobes, two outer lobes 1001 & 1002 and an inner lobe 1003, can rotate on a cam rail (engine camshaft) 1000 of a type II engine valvetrain. Actuators for the SRFF can comprise electro-mechanical latches or cam lobes, among others. The rocker arm can be mounted in a type II overhead cam valvetrain having one or more cam rails. Or, other actuation rails can be implemented for a cam/cam less system having some cam operations and some operations without cams. Each roller 400, 410, 310 of the rocker arm (SRFF) can correspond to a cam lobe or other actuator.

The shapes of the cam lobes 1001, 1002, 1003 determine the motion of the SRFF as a latch mechanism 900 within the pivot body 111 is selectively actuated.

Figure 3:
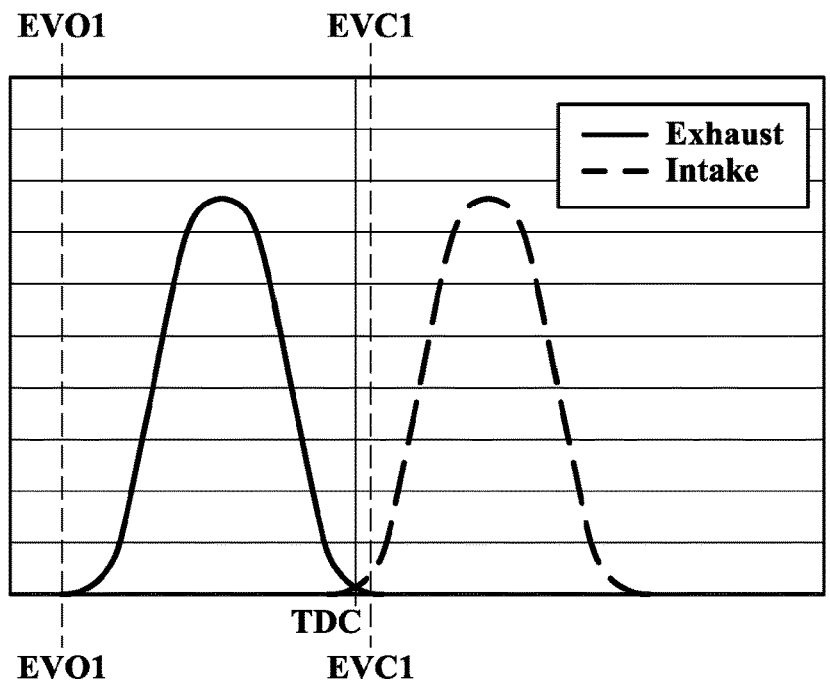
FIG. 3 is a view of a nominal lift profile.

FIG. 3 shows a nominal exhaust valve lift profile and a nominal intake valve lift profile. The timing for the exhaust valve opening EVO1 is shown with respect to the timing for the exhaust valve closing EVC1. Exhaust valve closing EVC1 occurs just after top dead center TDC of the piston stroke of the affiliated reciprocating piston in the affiliated engine cylinder. The intake valve opens and closes, with intake valve opening beginning slightly before the piston reaches top dead center TDC. Many techniques exist for advancing or retarding the lift profiles of the intake and exhaust valves, and many reasons exist to do so. However, it is not readily obvious to use particular advancements or retardings of the valve lift profiles across all operating conditions. Nor, even if a profile is used in one engine operating condition, it is not readily obvious to use it at a different operating condition (low load, idle, high load, among others).

Figure 4:
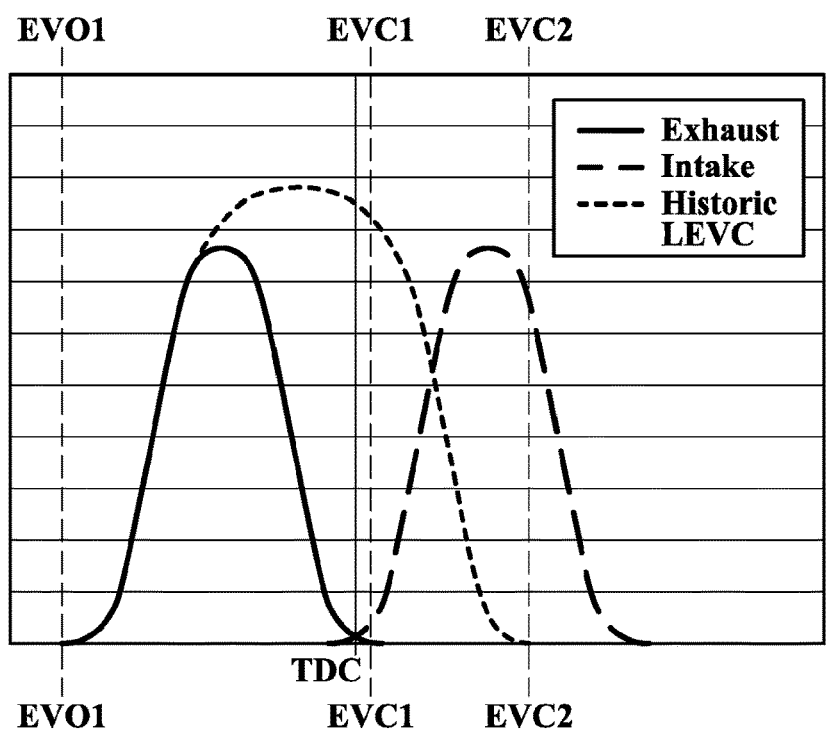
FIG. 4 is a view of a nominal lift profile overlaid with a curve according to a historic late exhaust valve closing ("LEVC") technique.

FIG. 4 overlays a historic late exhaust valve closing ("LEVC") lift profile on top of the nominal lift profiles shown in FIG. 3. Historically, late exhaust valve closing is accomplished by making the valve lift higher and longer. Exhaust valve closure EVC2 can be extended well in to the intake valve lift profile, and even past the intake valve lift to complete during intake valve closure. In some operating conditions, the outcome is beneficial. But, when the aftertreatment is cold, as when the engine is in an idle operating condition or a low load warm-up condition, the excess height and valve opening time is deleterious. In addition, an overlift condition can occur resulting in valve clearance issues with the piston. A lot of exhaust gas escapes the cylinder, limiting internal exhaust gas recirculation (iEGR). And, the intake valve and exhaust valve are open at large heights at the same time. Heat-up of the aftertreatment is limited.

New Valvetrain Ideas have similarities to applications in the gasoline market. However, the ramification of applying these techniques in the diesel engine market differ significantly from the gasoline market at least because of the differences in aftertreatment/particulate/pollution filtering techniques.

Figure 5:
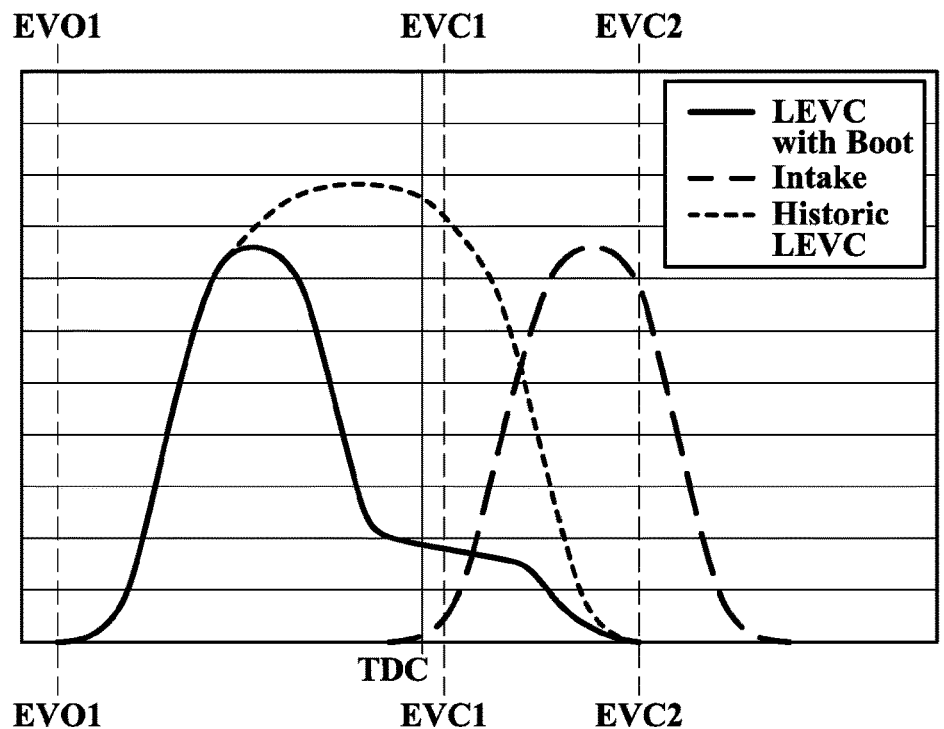
FIG. 5 is a view of a boot-shaped lift profile in accordance with the disclosure overlaid with a curve according to a historic late exhaust valve closing ("LEVC") technique.

Turning to FIG. 5, a method adds a "boot" shaped profile to the LEVC (late exhaust valve closing) profile. There is no overlift condition using this method. Additionally, the lower lift in the extended boot shape restricts the exhaust that can escape the cylinder. Internal exhaust gas recirculation is improved because the lower lift traps more exhaust in the cylinder.

The exhaust valve can follow the nominal lift profile to open and at a point after exhaust valve closing begins, the latch 900 can be moved by the latch phaser and the boot-shaped profile can be transitioned to. Instead of the exhaust valve closing at exhaust valve closing EVC1, the exhaust valve closing EVC2 is reached at a significantly lower lift height than the historical LEVC technique. An appropriately selected step-up ratio in the linkage 5000 can couple between the cam phaser 4000 and the latch phaser 6000 to spin the latch cam lobe 6002 to an actuated position to enable the extended lift profile.

Rocker arm can be unlatched while the cam 1003 is at base circle. This results in a valve 2000 following the nominal lift profile of the outer lobes 1001, 1002. Controlling latch phaser 6000 to actuate latch mechanism 900 can retract latch finger 906 and permit inner arm assembly 209 to swing down when the peak of the eccentric portion of the cam lobes 1001, 1002 presses against roller 310. The outer lobes 1001 & 1002 press upon the outer rollers 400 and the affiliated valve 2000 follows the lift profile of the outer lobes.

HLA or like mechanism can connect the SRFF to an engine block on the pivot end 11 of the SRFF. Additionally or alternatively, a push rod can be coupled to the HLA 3000. A valve end 12 of the SRFF can comprise a valve seat in the form of a valve pallet 115, valve seat 600, or the like, for mounting a valve stem end 2001 of a valve so that the valve head 2003 can be opened and closed to provide the desired valve profile.

When the SRFF is latched, an extended lift profile corresponding to the "toe" of the "boot" shape can be enacted. With the cam phaser 6000 actuated to extend the latch 900 to the actuated position, the latch seat 901 extends to catch against the inner arm 220. Then the inner lobe 1003 presses on the rocker arm for the extended lift profile to close the valve 2000 at exhaust valve closing EVC2. The inner cam lobe 1003 can be designed with a different cam lift profile than the outer lobes 1001, 1002. The eccentricity of the lobes can be designed so that as the cam lobes rotate (shown as cam angle in degrees) off their base circle, the valve head 2003 can open and close with one or more of different timing, duration and extent. The outer lobes 1001, 1002 can be designed with a smaller cam lift than the inner lobe 1003. With the SRFF unlatched, the inner lobe 1003 pushes on the inner roller 310 linked to inner arms 200, 210 and the outer lobes 1001, 1002 push on the outer rollers 400, 410 to result in a nominal lift profile. The inner arm swings down as in FIG. 2B. When the inner arm assembly 209 pivots on the pivot axle, "lost motion" is said to occur, and the inner arms 200, 210 can pivot to permit variable valve lift events.

FIGS. 2A & 2B are example lift profiles. Other lift profiles are possible and have not been drawn exhaustively. The functionality can be reversed so that the extended lift occurs on the outer rollers and the nominal lift occurs on the inner roller. The bias of the latch 900 can be reversed for the circumstances also, so that the latch is biased closed instead of biased open. As drawn, the rocker arm can comprise three rollers 400, 410, 310. Two outer rollers 400, 410 are mounted in a cantilever fashion outboard on the rocker arm to rotate on posts 123, 133 on the outer arms. Inner roller 310 can be mounted on a bearing axle 300 spanning between the inner arm 209.

The third roller (inner roller) 310 can be mounted on an independent bearing axle, such as second axle 300, between the inner arms 220, 230. The inner arms 220, 230 can pivot on a pivot axle, such as first axle 302. The pivot axle can connect the inner arm assembly 209 to distal ends of the outer arms 120, 130. First axle 302, as pivot axle, can also connect the at least one biasing mechanism, center spring 509, to the rocker arm.

Other techniques such as cylinder deactivation (CDA) (valve closure) and early or late valve techniques, including negative valve overlap (NVO), early or late intake valve opening or closing (EIVC, LIVC, EIVO, LIVO), or early or late exhaust valve opening or closing (EEVO, EEVC, LEVO, LEVC) can be enabled by the modifications to disclosed system, albeit that not all alternatives will be used while the aftertreatment is cold or while conflicting techniques are being used.

Figure 6:
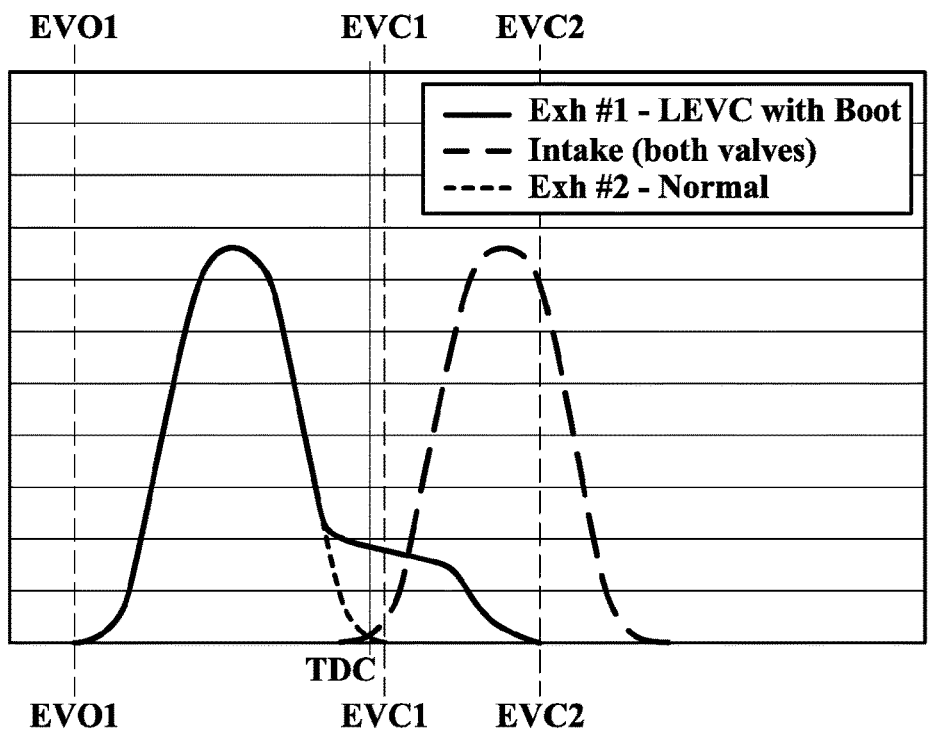
FIGS. 6-8 are views of alternative boot-shaped lift profiles in accordance with the disclosure.

Turning to FIG. 6, an alternative is shown where there are two exhaust valves and two intake valves. A first of the two exhaust valves follows the boot-shaped profile of FIG. 5 to provide a nominal exhaust valve opening at EVO1 and a low lift late exhaust valve closing at EVC2. The second exhaust valve follows the nominal (normal) lift profile, opening and closing at EVO1 & EVC1). Both intake valves follow the nominal lift profile.

By actuating the cam phaser 4000 from the nominal lift position described for FIGS. 3-5 to an advanced lift position, it is possible to provide early exhaust valve opening ("EEVO"). This can be seen in FIGS. 7 & 8. The linkage 5000 coupled between the cam phaser 4000 and the latch phaser 6000 can spin the latch cam lobe 6002 to an actuated position to enable the extended lift profile. At the same time, the cam phaser 4000 is moved to a position enabling EEVO. ECU can issue a command to actuate the cam phaser so that the exhaust valve opening time is moved to exhaust valve opening EVO2, which is earlier in the valve cycle time than EVO1 (nominal). By way of example, the cam phaser can move 5-45 degrees to adjust the opening time of the exhaust valve. Depending on whether the latch 900 is biased open or closed, the latch phaser 6000 can be linked via linkage 5000 to move the cam lobe 90 degrees. If an egg shaped cam lobe is moved, other rotation amounts can be used, such as 180 degree rotation of the second cam rail. Less rotation of the second cam rail could be necessary, as when moving a lever or spring such as disclosed in WO 2017/060496.

One Strategy for improving exhaust thermal management comprises incorporating cam phasing on the exhaust with a LEVC "boot" on one exhaust valve. The cam phasing will promote IEGR thru Negative Valve Overlap (NVO). This means that all of the exhaust is not allowed to leave the cylinder such that exhaust gas remains in the cylinder. The LEVC helps maintain the fuel economy of the engine by bringing the exhaust profile back to around TDC while the lower lift restricts the amount of exhaust leaving, which promotes IEGR. Using exhaust cam phasing promotes Early Exhaust Valve Opening (EEVO), which results in high exhaust temperatures. This combination can produce higher exhaust temperatures on the order of a 100 degree Centigrade increase while managing fuel economy.

Figure 7:
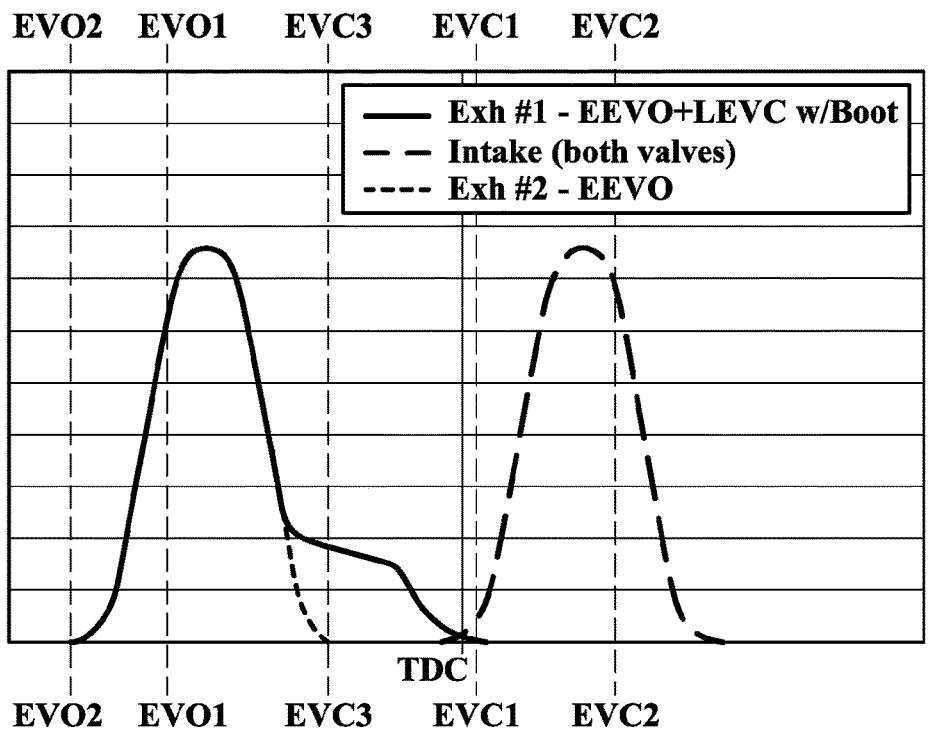

These benefits inure in FIG. 7, where a first of two exhaust valves follow a first exhaust valve lift profile comprising an early exhaust valve opening with a nominal lift height beginning at EVO2. By controlling the latch phaser, the extended lift results in nominal exhaust valve closing at EVC1. This avoids the intake and exhaust valves being open at the same time. The second of the two exhaust valves follows a nominal lift profile that is shifted in time to occur earlier. So, an early exhaust valve opening occurs at EVO2, and then early exhaust valve closing occurs at EVC3. EVC3 is earlier in the valve cycle than nominal closing at EVC1. Both intake valves in this example follow nominal lift profiles.

Figure 8:
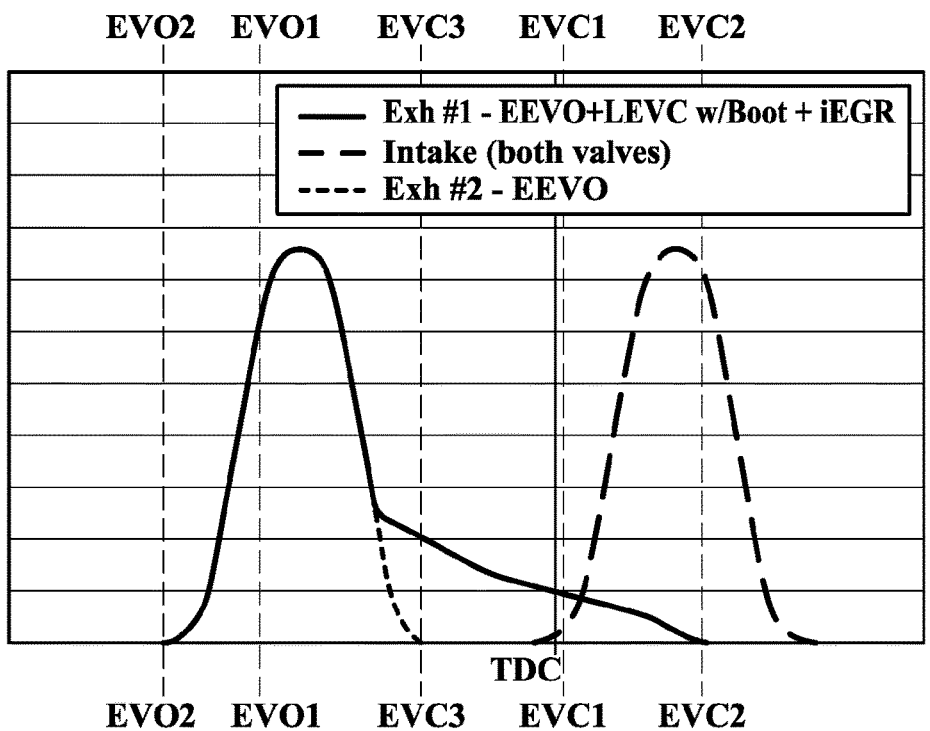

In FIG. 8, the extended low lift exhaust valve closing event is controlled via the shape of the corresponding cam lobe to provide iEGR and valve closing well in the intake valve lift profile at EVC2. The timing of the late exhaust valve closing can be described in FIG. 8 to be terminated when a reciprocating piston in the cylinder is at bottom dead center. Alternatively, the timing of the late exhaust valve closing can be described as terminated as an intake valve reaches full lift. The cam phaser 4000 is controlled to provide EEVO at exhaust valve opening EVO2. The nominal lift height and lift duration is followed until a point in the exhaust valve closing cycle that is prior to full exhaust valve closure, at which point the latch 900 positions with respect to inner arm 209 so that the extended lift profile (boot shape) is applied. Late exhaust valve closing EVC2 occurs past nominal exhaust valve closing EVC1. A second exhaust valve of a pair of exhaust valve operating on a cylinder can follow the nominal lift height and nominal lift duration, but the nominal lift profile is shifted to provide EEVO and EEVC.

Natural negative valve overlap can be achieved since the duration of the majority of the exhaust valve lift event isn't changed, it is just moved up earlier with EEVO. On one exhaust valve, there is no penalty to NVO because the duration of the lift event is nominal. On the other exhaust valve, intentional exhausting during the intake event achieves iEGR, and the net is more EGR and greater efficacy to heat the aftertreatment at cold start, low load, or idle, and preferably during diesel warm-up cycles.

In one aspect, an improvement couples all of the linkages to the exhaust cam phaser. This removes complexity of controls and extra hardware. The exhaust cam phaser is connected to the gear on the cam such that:

With no cam phasing, the latch is in the unlatched position such that the normal exhaust valve profiles results With cam phasing, the second cam rail 6001 is turned to latch the latch, such that LEVC in combination with EEVO occurs.

Benefits:

This is an electromechanical system that removes a motor but still provides cam phasing to a diesel engine combustion system.

The cam phaser, once phased, engages a latching pin to enable LEVC.

OBD (on-board diagnostics) control is already present for the engine, and is already tied to exhaust cam phasing. So, if the cam is phased, then the latch is latched. And existing OBD technology can be leveraged in a new way.

This configuration can be applied to the following:
 a. EEVO+LEVC on both exhaust valves
 b. EEVO on one exhaust valve and EEVO+LEVC on the other exhaust valve
 c. LIVC (late intake valve closing) on one or two intake valves
 d. LIVO (late intake valve opening)+LIVC on one or two intake valves While the figures do not show changes to the intake valve lift profiles, and the intake valve profiles are shown to be nominal, it will be appreciated that the lift profiles can be adjusted to permit LIVC and LIVO.

A method according to the disclosure can comprise sensing a key-on event, an idle event, or a cold aftertreatment condition and commanding the cam phaser 4000 to shift the engine camshaft to an early exhaust valve opening position. The linkage 5000 can be connected to the latch phaser to position the latch for an extended exhaust valve lift event on the rocker arm. If the aftertreatment is below 150 degrees Centigrade, or below 100 degrees Centigrade, the method can proceed to heat the aftertreatment using the EEVO and extended (boot shaped) lift profile. This mode has high particulate output, and so its use is restricted. For example, this mode can be used for the first 10 of the 600-650 seconds needed to heat a diesel aftertreatment. This mode can be used until the aftertreatment is over 100 degrees Centigrade or until the aftertreatment is over 150 degrees Centigrade. Then, it is possible to switch to another operation mode such as cylinder deactivation to continue heat up of the aftertreatment. It is additionally possible to use this mode when the engine is under 3 Bar BMEP and so restrict the method to engine operating conditions below 3 Bar BMEP ("brake mean effective pressure").

Other implementations will be apparent to those skilled in the art from consideration of the specification and practice of the examples disclosed herein.

What is claimed is:

1. A method for advancing valve actuation during low load or idle diesel engine conditions to promote aftertreatment heat up, comprising:
 switching a cam phaser from a nominal lift position to an advance lift position to open an affiliated valve before nominal;
 actuating valve lift via the cam phaser such that the valve begins opening at or near a piston bottom-dead-center;
 lowering the valve towards nominal closure;
 interrupting valve closure by actuating a latch phaser before the piston reaches a next top-dead-center; and extending valve closure beyond nominal valve closure such that valve closure occurs at or near the next piston bottom-dead center.

2. A method for exhaust thermal management on a cylinder of a diesel combustion engine, comprising:
- implementing late exhaust valve closing on a first exhaust valve of a pair of exhaust valves;
- implementing one of a normal exhaust valve closing and an early exhaust valve opening on a second exhaust valve of the pair of exhaust valves;
- opening an intake valve to provide negative valve overlap with the late exhaust valve closing of the first exhaust valve, wherein both the intake valve and the first exhaust valve are open at the same time, and wherein the first exhaust valve closes when the intake valve is at or near full lift;
- implementing internal exhaust gas recirculation via the negative valve overlap; and
- increasing the exhaust temperature of an affiliated exhaust stream via the internal exhaust gas recirculation.

3. The method of claim 2, comprising: implementing the late exhaust valve closing via cam phasing.

4. The method of claim 2, comprising lifting the first exhaust valve at the late exhaust valve closing at a lower lift than the second exhaust valve of the pair of exhaust valves.

5. The method of claim 2, comprising switching from a normal lift profile on the first exhaust valve to the late exhaust valve closing, wherein the late exhaust valve closing is done at a lower lift height of the first exhaust valve than the normal lift profile.

6. The method of claim 2, comprising selecting a lift height for the lift profile of the late exhaust valve closing to prevent complete release of the exhaust gas during the negative valve overlap.

7. The method of claim 2, further comprising implementing early exhaust valve opening on the first exhaust valve.

8. The method of claim 7, wherein implementing the early exhaust valve opening comprises the first exhaust valve having a higher lift profile during the early exhaust valve opening than a late exhaust valve closing profile during the late exhaust valve closing.

9. The method of claim 7, comprising transitioning the second exhaust valve from the early exhaust valve opening profile to a late exhaust valve closing profile.

10. The method of claim 2, further comprising implementing early exhaust valve opening on the pair of exhaust valves.

11. The method of claim 10, wherein implementing the early exhaust valve opening comprises the pair of exhaust valve having higher lift profiles during the early exhaust valve opening than late exhaust valve closing profiles during the late exhaust valve closing.

12. The method of claim 2, comprising timing the late exhaust valve closing to be implemented when a reciprocating piston in the cylinder is at top dead center.

13. The method of claim 2, comprising transitioning the at least one intake valve from a late intake valve opening profile to a late intake valve closing profile.

14. The method of claim 2, comprising implementing an early intake valve opening on the intake valve.

15. The method of claim 2, comprising opening the intake valve before a reciprocating piston in the cylinder is at top dead center.

16. A method for exhaust thermal management on a cylinder of a diesel combustion engine, comprising:
- implementing late exhaust valve closing on a first exhaust valve of a pair of exhaust valves;
- implementing a normal exhaust valve closing on a second exhaust valve of the pair of exhaust valves;
- opening an intake valve to provide negative valve overlap with the late exhaust valve closing of the first exhaust valve, where both the intake valve and the first exhaust valve are open at the same time;
- implementing internal exhaust gas recirculation via the negative valve overlap;
- completing closing the first exhaust valve when the intake valve is at or near full lift; and
- increasing the exhaust temperature of an affiliated exhaust stream via the internal exhaust gas recirculation,
- wherein the late exhaust valve closing is done at a lower lift of the first exhaust valve than a normal lift of the normal exhaust valve closing on the second exhaust valve.

17. The method of claim 16, comprising timing the late exhaust valve closing to be implemented when a reciprocating piston in the cylinder is at top dead center.

18. The method of claim 17, comprising timing the late exhaust valve closing to be terminated when a reciprocating piston in the cylinder is at bottom dead center.

* * * * *